United States Patent [19]

Druskis et al.

[11] Patent Number: 5,264,161
[45] Date of Patent: Nov. 23, 1993

[54] METHOD OF USING SURFACTANTS AS CONTACT LENS PROCESSING AIDS

[75] Inventors: Robert J. Druskis, Webster; Rose Ann Milne, Penfield; Dennis Hahn, Rochester, all of N.Y.

[73] Assignee: Bausch & Lomb Incorporated, Rochester, N.Y.

[21] Appl. No.: 755,201

[22] Filed: Sep. 5, 1991

[51] Int. Cl.$^5$ .............................................. B29D 11/00
[52] U.S. Cl. .................... 264/2.6; 134/25.4; 134/29; 252/41; 252/52 A; 264/2.3; 264/334; 264/337; 264/344
[58] Field of Search ............... 264/2.3, 2.6, 334, 337, 264/344; 252/41, 52 A, 106, DIG. 1, DIG. 14; 134/25.4, 29, 26

[56] References Cited

U.S. PATENT DOCUMENTS

| | | |
|---|---|---|
| 2,976,576 | 3/1961 | Wichterle .............................. 264/2.6 |
| 3,220,960 | 11/1965 | Wichterle . |
| 3,426,102 | 2/1969 | Solak . |
| 3,428,043 | 2/1969 | Shepherd ............................ 123/268 |
| 3,496,254 | 2/1970 | Wichterle ............................ 264/2.6 |
| 3,520,949 | 7/1970 | Shepherd . |
| 3,618,231 | 11/1971 | Nason . |
| 3,679,504 | 7/1972 | Wichterle .............................. 156/62 |
| 4,042,652 | 8/1977 | Feneberg ............................. 264/2.3 |
| 4,347,198 | 8/1982 | Ohkada et al. ...................... 264/2.6 |
| 4,534,916 | 8/1985 | Wichterle ............................ 264/2.3 |
| 4,699,934 | 10/1987 | Ohkado et al. . |
| 4,761,069 | 8/1988 | Truong et al. ....................... 264/2.3 |
| 4,983,332 | 1/1991 | Hahn et al. . |
| 5,034,461 | 7/1991 | Lai ...................................... 525/100 |
| 5,080,839 | 1/1992 | Kindt-Larsen ....................... 264/2.3 |

FOREIGN PATENT DOCUMENTS 0436153  7/1991  European Pat. Off. .
0453231  10/1991  European Pat. Off. .

*Primary Examiner*—Jan H. Silbaugh
*Assistant Examiner*—Mathieu Vargot
*Attorney, Agent, or Firm*—David M. Krasnow; Craig E. Larson

[57] ABSTRACT

An improved method for manufacturing hydrophilic polymeric devices wherein surfactants are added to the hydration bath to assist in the mold release and processing of hydrophilic polymeric devices, especially hydrophilic contact lenses.

10 Claims, No Drawings

METHOD OF USING SURFACTANTS AS CONTACT LENS PROCESSING AIDS

FIELD OF THE INVENTION

The present invention relates to the use of surfactants in a hydration bath to assist in the processing of hydrophilic polymeric devices, especially hydrophilic contact lenses.

BACKGROUND

Soft contact lenses are produced by a number of methods including static cast molding, spincasting, lathing and combinations of casting and lathing. A critical step in the production of lense using molds is releasing the lens from the mold without damaging the lens. One method of lens release is to hydrate the lens. The lens-in-mold assembly is placed in a hydration tank filled with water. The water is usually heated.

Often hydration alone does not release the lenses from the molds. The lenses must then be gently removed from molds by hand. Such hand-assisted lens removal increases the liklihood of lens damage. These damaged lenses often fail the subsequent quality inspections due to tearing, nicks, or other surface defects which occur as the lenses are released from the molds. One surface defect which is prevalent and which is commonly measured is known as the POM (piece of material) defect. This defect occurs as a result of excess polymer debris adhering to the lens. In essence, the POM defect causes an irregular surface on the lens due to an additional piece of material adhering to the lens.

A method of improving the release rate and decreasing the incidence of POM defect by facilitating the release of spincast and castmolded lenses which, in turn, would significantly increase the useable lens yield for such lenses, is not known. This invention addresses the problem of undesirably low cosmetic yields of contact lenses during hydration release.

SUMMARY OF THE INVENTION

The present invention relates to the discovery that the addition of surfactants into the aqueous hydration bath at specified concentrations, facilitates the release of lenses from molds. The present invention relates to an improved method for releasing hydrophilic polymeric devices from plastic molds in aqueous hydration baths the improvement of which comprises the addition of a surfactant to an aqueous bath in an amount sufficient to achieve a surfactant concentration of from 0.1 wt. % to 10 wt. %. The present invention further reduces or eliminates the incidence of the POM defect on contact lenses. The resulting new aqueous hydration bath compositions comprising the surfactants, result in a surprisingly superior method of lens release.

It was discovered that the lens yield was drastically improved when surfactants were incorporated in the hydration bath. This increased yield is due to both improved lens release and to reduction of POM defects. The enhanced level of lens release from the molds obviates the need to manually assist lens removal from the mold upon hydration. Eliminating the need for manual assistance eliminates lens damage which commonly occurs during manual lens removal. The cosmetic yield, or the number of acceptable lenses without nicks, tears, POM or other cosmetic defects therefore improved over the usual yield.

DETAILED DESCRIPTION OF THE INVENTION

The hydration bath of the present invention comprises an aqueous solution of at least one surfactant. Suitable surfactants include any material which reduces the surface tension of water. The effective surfactants are those which may be incorporated into the aqueous hydration bath. Preferred surfactants are polymeric materials that have hydrophobic and hydrophilic portions. Such polymeric surfactants include polyoxyethylene lauryl ethers, polyoxyethylene nonylphenyl ethers, polyoxyethylene sorbitan monooleates, polyoxyethylene sorbitan monolaurates, polyoxyethylene sorbitan monopalmitates, polyoxyethylene stearyl ethers, and their polyoxypropylene analogs. Other surfactants found to be effective are the poloxamines, dioctyl sodium sulfo-succinate, and polyvinyl alcohol.

The mold materials used for the spincasting or static cast molding may be one piece or more. If two part molds are used, each mold part may be made of a different composition with the molded polymeric device preferentially adhering to one of the mold parts. The mold parts may be made from any plastic conventionally used to mold hydrophilic polymeric devices. Preferred plastic materials are polyethylene, polypropylene, polystyrene, polyvinyl chloride, copolymers thereof, nitrile resins, and with polyvinyl chloride being the most preferred mold material to which the molded hydrophilic polymeric device adheres.

The contemplated hydrophilic polymeric material used in the mold to make the hydrophilic polymeric devices are any hydrogels, silicone-containing hydrogels, urethane prepolymers, ethylenically terminated polysiloxane prepolymers and other hydrophilic polymers some of which are the subject of commonly assigned U.S. Pat. No. 5,034,461, issued Jul. 23, 1991.

The optimal concentrations of the surfactants used depend upon the temperature of the hydration bath and the amount of time that the lens-in-mold piece is allowed to be exposed to the hydration bath. Use of various surfactants at elevated temperatures, generally those above 98 degrees C. have experimentally been observed to cloud the hydration bath which makes retrieval of the released lenses from the hydration bath more complicated.

The contemplated concentration of surfactants in the aqueous hydration baths ranges from about 0.1 wt % to about 10 wt %, with the preferred concentration ranging from about 0.25 wt % to about 10.0 wt %, and with a 0.5 wt % concentration being most preferred when the bath temperature is 40 degrees C. The contemplated hydration bath temperatures range from about 30 degrees C. to about 100 degrees C., with the preferred temperature ranging from about 35 degrees C. to about 80 degrees C., and with 40 degrees C. being the most preferred operating temperature.

The surfactant used in the present invention may be selected from the group of polyoxyethylene lauryl ethers, polyoxyethylene nonylphenyl ethers, polyoxyethylene sorbitan monooleates, polyoxyethylene sorbitan monolaurates, polyoxyethylene sorbitan palmitates, polyoxyethylene stearyl ethers, and their polyoxypropylene analogs, dioctyl sodium sulfosuccinate and polyvinyl alcohol, with polyoxyethylene sorbitan monooleate being most preferred.

It is contemplated that the mold releasing hydration bath of the present invention will assist in the release of cast hydrophilic polymers from molds made from polyethylene, polypropylene and polyvinyl chloride, copolymers thereof, nitrile resins such as Barex (BP Chemicals) which are described in U.S. Pat. No. 3,426,102. Other resins as are known in the field may also be used as the mold material, such as the nitriles and nitrile resins some of which are the subject of co-pending and commonly assigned U.S. Ser. No. 618,448 filed Nov. 27, 1990. The hydrophilic polymeric device being released from the mold may be any device which can be static cast molded or spin cast molded, but is preferably a contact lens.

While this invention has been described with particular reference to contact lenses, the method of this invention is useful in forming a whole variety of shaped articles used in biomedical applications. Such articles include dialyzer diaphragms, artificial kidneys and other implants (see U.S. Pat. Nos. 2,976,576 and 3,220,960), therapeutic bandages (U.S. Pat. No. 3,428,043), surgical devices such as heart valves, vessel substitutes, interuterine devices, membranes and other films, catheters, mouth guards, and denture liners (U.S. Pat. Nos. 3,520,949 and 3,618,231), and ophthalmic prostheses (U.S. Pat. No. 3,679,504). Particularly preferred shaped articles for the purposes of this invention are contact lenses and preforms wherein one surface of the lens is formed in the molding process.

The following examples serve only to further illustrate aspects of the present invention and should not be construed as limiting the invention.

EXAMPLES

Surfactant concentration, bath temperature and hydration time were the factors studied. Number of lenses displaying POM when viewed through an optical comparator at 10x magnification, and total cosmetic yield were the measured responses. Cosmetic yield represents those lenses observed to be free from nicks, tears and POM at said 10x magnification. All listed Examples used cast-molded combinations. The lens material used was uniformly a HEMA (hydroxyethylmethacrylate) based contact lens material. The molds were made from polyvinyl chloride.

EXAMPLE 1

Pure Aqueous Control Bath—No Surfactant

Twenty lens-in-mold assemblies were added to a 7 liter control hydration bath at 80 degrees C. with no surfactant present. The lenses were removed from the bath and inspected for POM defect. The results showed that 33% of the lenses had POM defect. Total cosmetic yields were not measured for this example.

EXAMPLE 2

Polyoxyethylene sorbitan 20 monooleate—10 wt%

Sixty lens-in-mold assemblies were added to a 7 liter hydration bath containing a 10 wt % concentration of poloxyethylene sorbitan 20 monooleate (Tween 80) (Ruger Chemical Co.) at 80 degrees C. An equal number of lens-in-mold assemblies were added to a completely aqueous control hydration bath under similar temperatures for comparison. The results showed that 7 % of the lenses in the bath with surfactant displayed the POM defect, while 52 % of the lenses in the pure aqueous hydration control bath had the POM defect. Total cosmetic yields were not measured for this example.

EXAMPLE 3

Poloxyethylene sorbitan 20 monooleate

Increasing concentrations of polyoxyethylene sorbitan 20 monooleate were added to a 7 liter aqueous hydration bath. Twenty lens-in-mold assemblies were added to the hydration bath with a 1 wt % concentration of polyoxyethylene sorbitan 20 monooleate. The bath was maintained at 40 degrees C. for 6 minutes. The cosmetic yield of the lenses was 60%, or greater than the cosmetic yield of the lenses released upon hydration without surfactant. No POM defect was observed. The further results of the 9 experimental runs are shown in Tables 1 and 2.

TABLE 1

| Exp. # (Min.) | Conc.(%) | Temp.(C.) | Time |
|---|---|---|---|
| 1 | 1 | 40 | 6 |
| 2 | 1 | 60 | 10 |
| 3 | 1 | 80 | 14 |
| 4 | 5 | 40 | 10 |
| 5 | 5 | 60 | 14 |
| 6 | 5 | 80 | 6 |
| 7 | 10 | 40 | 14 |
| 8 | 10 | 60 | 6 |
| 9 | 10 | 80 | 10 |

TABLE 2

| Exp. # | Number of Lenses with POM | Cosm. Yield(%) |
|---|---|---|
| 1 | 0 | 60 |
| 2 | 0 | 55 |
| 3 | 0 | 70 |
| 4 | 0 | 60 |
| 5 | 0 | 45 |
| 6 | 0 | 75 |
| 7 | 1 | 55 |
| 8 | 0 | 55 |
| 9 | 0 | 55 |

EXAMPLE 4

Polyvinyl alcohol

Increasing concentrations of polyvinyl alcohol were added to a 7 liter hydration bath. Twenty lens-in-mold assemblies were added to a hydration bath maintained at 40 degrees C. for 6 minutes. The released lenses displayed a 95% acceptable POM rate, meaning that only 1 lens out of twenty had apiece of material deposition. The cosmetic yield of the lenses was 50%, or greater than the ordinary cosmetic yield of released cast lenses hydrated without surfactant. The further results of the 9 experimental runs are shown in Tables 3 and 4.

TABLE 3

| Exp. # (Min.) | Conc.(%) | Temp.(C.) | Time |
|---|---|---|---|
| 1 | 1 | 40 | 6 |
| 2 | 1 | 60 | 10 |
| 3 | 1 | 80 | 14 |
| 4 | 5 | 40 | 10 |
| 5 | 5 | 60 | 14 |
| 6 | 5 | 80 | 6 |
| 7 | 10 | 40 | 14 |
| 8 | 10 | 60 | 6 |
| 9 | 10 | 80 | 10 |

TABLE 4

| Exp. # | Number of Lenses with POM | Cosm. Yield(%) |
| --- | --- | --- |
| 1 | 1 | 50 |
| 2 | 1 | 70 |
| 3 | 0 | 55 |
| 4 | 0 | 80 |
| 5 | 3 | 50 |
| 6 | 0 | 65 |
| 7 | 0 | 80 |
| 8 | 0 | 55 |
| 9 | 1 | 80 |

EXAMPLE 5

Polyvinyl alcohol

Eighty-six lens-in-mold assemblies were hydrated in a 0.1 wt % polyvinyl alcohol (PVA) in buffered saline solution at 80 degrees C. An equal number of lens-in-mold assemblies were hydrated under the same conditions in a pure aqueous control hydration bath for comparison. The results showed that 62% of the lenses in the hydration bath with surfactant had the POM defect. Thirty-four percent (34%) of the lenses hydrated in the control bath had the POM defect. The low concentration of PVA coupled with a saline solution did not produce satisfactory results.

EXAMPLE 6

Poloxyethylene sorbitan 20 monoleate

The results of experiments 4 and 5 led to the conclusion that a smaller surfactant concentration should be evaluated. Once again, increasing concentrations of polyoxyethylene sorbitan 20 monooleate were added to a 7 liter hydration bath. Thirty lens-in-mold assemblies were added to the hydration bath with a 0.5% concentration of polyoxyethylene sorbitan 20 monooleate. The bath was maintained at 40 degrees C. for 10 minutes. The released lenses displayed a 90% acceptable POM rate, meaning that no significant piece of material deposition had occurred. The cosmetic yield of the lenses was 66.7%, or greater than the ordinary cosmetic yield of hydrated cast lenses released without surfactant. The first three runs of this experiment were conducted without any surfactant present. The further results of the 9 experimental runs are shown in Tables 5 and 6.

TABLE 5

| Exp. # (Min.) | Conc.(%) | Temp.(C.) | Time |
| --- | --- | --- | --- |
| 1 | 0 | 40 | 6 |
| 2 | 0 | 60 | 10 |
| 3 | 0 | 80 | 14 |
| 4 | 0.5 | 40 | 10 |
| 5 | 0.5 | 60 | 14 |
| 6 | 0.5 | 80 | 6 |
| 7 | 1.0 | 40 | 14 |
| 8 | 1.0 | 60 | 6 |
| 9 | 1.0 | 80 | 10 |

TABLE 6

| Exp. # | Number of Lenses with POM | Cosm. Yield(%) |
| --- | --- | --- |
| 1 | 0 | 76.7 |
| 2 | 10 | 53.3 |
| 3 | 18 | 26.7 |
| 4 | 3 | 66.7 |
| 5 | 8 | 70 |
| 6 | 2 | 63.3 |
| 7 | 8 | 63.3 |
| 8 | 3 | 66.7 |
| 9 | 1 | 83.3 |

Many other modifications and variations of the present invention are possible and will be readily apparent to the skilled practitioner in the field in light of the teachings herein. It is therefore understood that, within the scope of the claims, the present invention can be practiced other than as herein specifically prescribed.

We claim:

1. An improved method for releasing hydrophilic polymeric lenses from plastic molds in which said polymeric lenses have been polymerized the improvement which comprises the addition of a surfactant to an aqueous hydration bath for releasing the lens, the hydration bath having an amount of surfactant sufficient to achieve a surfactant concentration of from 0.1 wt. % to 10 wt. %.

2. The method of claim 1 wherein said surfactant is selected from the group consisting of polyoxyethylene lauryl ethers, polyoxyethylene nonylphenyl ethers, polyoxyethylene sorbitan monooleates, polyoxyethylene sorbitan monolaurates, polyoxyethylene sorbitan monpalmitates, polyoxyethylene stearyl ethers, and their polyoxypropylene analogs.

3. The method of claim 1 wherein said surfactant is dioctyl sodium sulfo-succinate.

4. The method of claim 1 wherein said surfactant is polyvinyl alcohol.

5. The method of claim 1 wherein the temperature of said bath ranges from 30 degrees C. to 100 degrees C.

6. The method of claim 1 wherein the temperature of said bath ranges from 35 degrees C. to 80 degrees C.

7. The method of claim 1 wherein said hydrophilic polymeric lenses are contact lenses.

8. The method of claim 1 wherein said bath comprises from 0.25 wt % to 10 wt % concentration of surfactant.

9. The method of claim 1 wherein said bath comprises a 0.5 wt % concentration of surfactant.

10. The method of claim 1 wherein said bath comprises a 0.5 wt % concentration of polyoxyethylene sorbitan 20 monooleate.

* * * * *